United States Patent [19]
Nakamura

[11] 3,924,108
[45] Dec. 2, 1975

[54] CASH REGISTER

[75] Inventor: Koichi Nakamura, Suwa, Japan

[73] Assignee: Kabushiki Kaisha Suwa Seikosha, Tokyo, Japan

[22] Filed: Dec. 16, 1974

[21] Appl. No.: 533,425

[52] U.S. Cl. .................. 235/152; 179/18 H; 235/2; 235/7 R; 235/60.11; 340/147 C; 360/5
[51] Int. Cl.² .......................................... G06F 13/00
[58] Field of Search............ 179/1 SW, 18 GF, 18 H, 179/59, 91 R; 235/2, 7 R, 58 M, 59 A, 60 C, 60.11, 152; 340/147 C; 360/5, 55; 445/1

[56] References Cited
UNITED STATES PATENTS
3,294,960  12/1966  Townsend............................ 235/2 X Primary Examiner—R. Stephen Dildine, Jr.
Attorney, Agent, or Firm—Blum, Moscovitz, Friedman & Kaplan

[57] ABSTRACT

An electronic cash register having a limited internal storage memory for storing a predetermined number of classification codes is provided. The cash register includes an input circuit adapted to produce classification code signals representative of a plurality of classification codes in excess of the predetermined number of classification codes storable in the memory. A conversion circuit adapted to receive the classification code signals and selectively apply certain of the classification code signals to the limited internal storage memory to effect storage of said certain classification codes.

5 Claims, 3 Drawing Figures

CASH REGISTER

BACKGROUND OF THE INVENTION

This invention is directed to an electronic cash register and, in particular, the increasing of the number classification codes capable of being monitored by a cash register having a limited internal storage memory. In the art, electronic cash registers including internal storage memories for monitoring sales information have gained wide acceptance. However, such internal storage memories have limited capacity due to the limited space available in the cash register. Because monitoring of sales information is facilitated by designating goods sold per retail unit with classification codes, storage of the classification codes in the internal memory effects improved monitoring of goods consumption by using a cash register. Nevertheless, internal storage memories of the type utilized in electronic cash registers are limited to storage of a predetermined number such as 10 classification codes.

Because the number of goods sold by retailing units has increased and become diversified, the limited capacity of the internal storage memory in such cash registers has rendered monitoring thereby less than completely satisfactory. Because detailed monitoring has become important in the effective management of the retailing unit by enabling consumption rates and trends of use to be effectively discerned, it is desirable to be able to increase the number of classification codes capable of being stored in the internal memory of a cash register and to be able to optionally select which codes are to be stored and monitored.

SUMMARY OF THE INVENTION

Generally speaking, in accordance with the invention, an electronic cash register having a limited internal storage memory adapted to store a predetermined number of classification codes is provided. The cash register includes an input circuit adapted to produce classification code signals representative of a plurality of classification codes in excess of the predetermined number storable in the memory. A conversion circuit is adapted to receive the classification code signals and selectively apply certain of said classification code signals to the memory for storage thereby.

Accordingly, it is an object of this invention to provide an improved electronic cash register having a limited internal storage memory.

Another object of this invention is to provide an improved electronic cash register having a limited internal storage memory wherein the number of goods monitored thereby is increased.

Still another object of this invention is to provide an electronic cash register including a limited internal storage memory capable of selectively monitoring certain classification codes.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
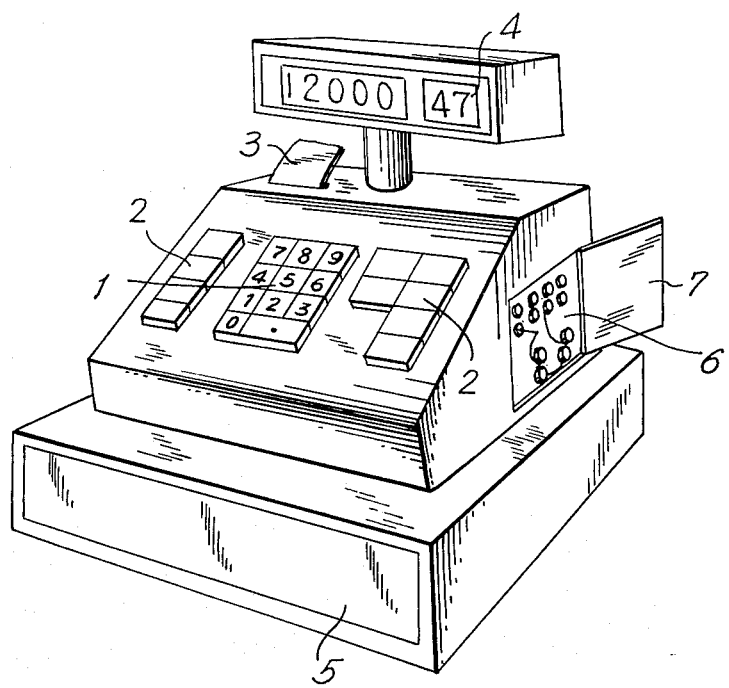
FIG. 1 is a perspective view of an electronic cash register constructed in accordance with the instant invention.

Referring to FIG. 1, an electronic cash register is illustrated therein. The register includes register keys for keying-in various prices and classification codes for goods sold by the retailing unit. The front of the register further includes various other control keys 2, a printing station 3, for printing a receipt for a customer, a display portion 4, for displaying the price and classification code selected by the cash register operator, and a cash drawer 5, which is continuously opened by the keying-in of price and classification code information to the register. A code converter 6 allows the operator to select which goods are to be monitored in a manner to be discussed hereinafter, and is located on the side of the cash register and is rendered accessible by opening cover 7.

Figure 2:
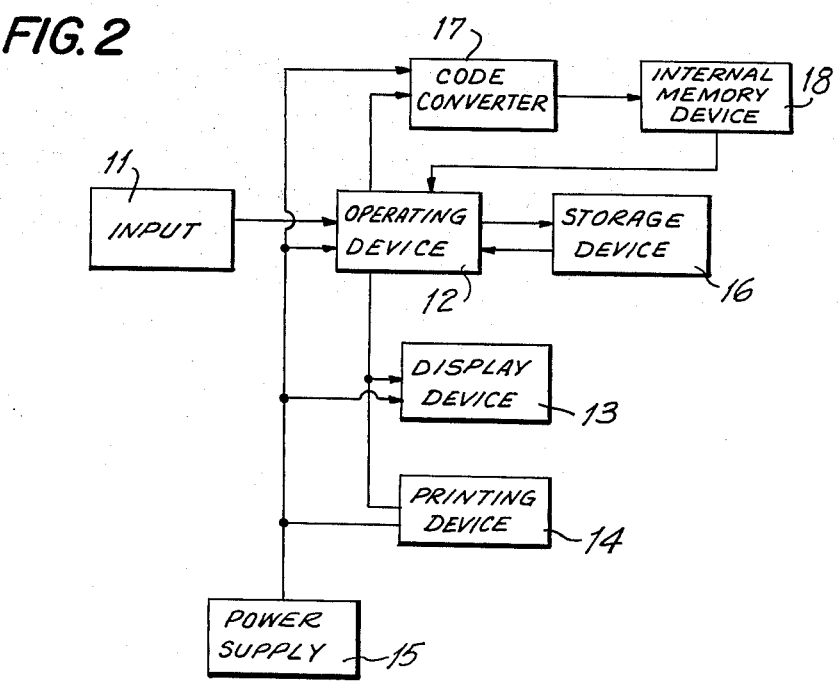
FIG. 2 is a block circuit diagram of an electronic cash register including the monitoring means which comprises the instant invention.

Referring now to FIG. 2, a block circuit diagram of the electronic cash register depicted in FIG. 1 is illustrated. An input circuit 11 produces classification code and price signals selected by keyboard 1. The signals produced by input circuit 11 are applied to an operating device 12 which in turn supplies signals corresponding to classification codes and also signals corresponding to price, to display device 13 allowing such signals to be displayed thereof. The price and classification code signals are also supplied to printing device 14 which allows such information to be printed upon a receipt 3 at the printing station which receipt can thereby be given to the customer. A power supply 15 is coupled to the operating divice 12, display device 13, and printing device 14 to effectively energize such components. The operating device is further coupled to a storage device 16 such as a cassette recorder. Storage device 16 collects and compilates the data signals produced by the input circuit. Additionally, storage device 16 can be utilized as a data transmission device for on line transmission to a central processing unit.

A limited space internal memory device 18 is coupled to the output of code converter 17 and receives converted signals from a code converter 17. Memory 18 is further coupled to operating device 12. Because of the limited storage space provided by the electronic cash register, as well as the expense of such memories, a typical memory utilized in accordance with the instant invention would only be capable of storing 10 goods classification codes. Accordingly, a code converter 17 is utilized to selectively store certain classification codes in limited space storage memory 18 in a manner to be discussed more fully below.

Figure 3:
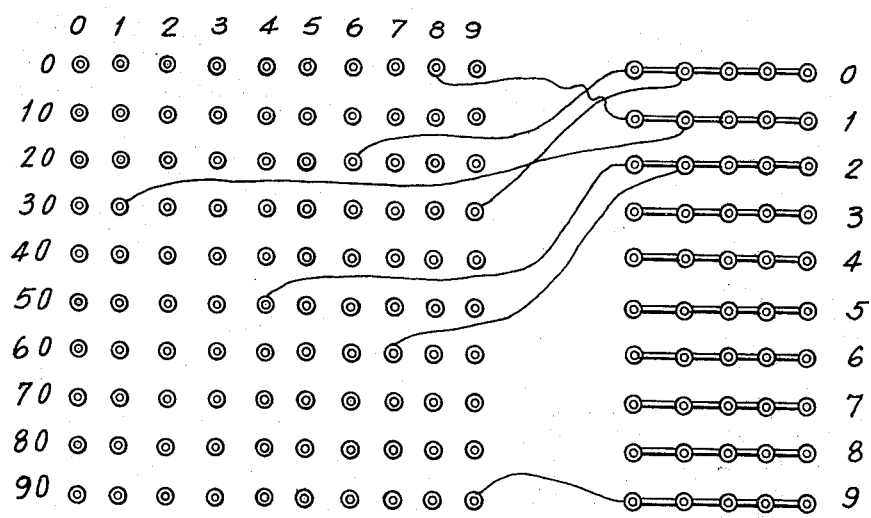
FIG. 3 is a perspective view of a code converter constructed in accordance with the instant invention.

Referring now to FIG. 3, one such code converter contemplated by the instant invention is illustrated therein. The code converter consists of a first board comprised of one hundred plugs and a second board comprised of 50 plugs. The one hundred plugs on the first board correspond to the classification codes which are generated by the cash register and supplied to the code converter 17 by the operating device 12. The 50 plugs on the second board are classified into 10 groups having five plugs corresponding to each group. Each one of the 10 groups corresponds to one of the 10 storage location of the internal memory device 18. Thus, by way of example, if a wire is plugged into the No. 31 terminal corresponding to classification code 31 and the other end of the wire is plugged into the group of terminals corresponding to the internal memory device storage location 1, each occurrence of a classification code having the number 31 will be stored as a single input to the group 1 location of the internal device 18.

In operation, the code converter circuit 17 allows the limited storage memory to provide storage capability for information corresponding to a hundred different classification codes. Operating device 12 supplies classification code signals to the code converter corresponding to the hundred different classification codes. An operator, such as a store manager, interested in monitoring certain consumption trends, selects connections to allow certain classification code signals to be applied to the 10 different storage locations in the internal memory, thus allowing the limited space internal memory to monitor the information selected.

It is noted that such a code converter circuit 17 is not limited to a plug board arrangement but could incorporate other random access devices. Moreover, the use of diodes in the plug board arrangement illustrated in FIG. 3 is contemplated for the prevention of reverse currents being applied to the cash register.

Accordingly, the merits and advantages of the electronic cash register hereinabove described are obtained in an inexpensive electronic cash register which is capable of monitoring several goods classifications during normal retailing unit check-out operations by the sales clerk.

It will thus be seen in the objects set forth above among those made apparent in the preceding description, are efficiently attained, and since certain changes may be made in the above construction without departing from the spirit and scope of the invention, it is intended that all matter contained in the above description as shown on the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electronic cash register having a limited internal storage memory adapted to store a predetermined number of classification code storage locations, the improvement comprising input means adapted to produce classification code signals representative of a plurality of classification codes in excess of the predetermined number of storage locations in said memory, and conversion means adapted to receive said classification code signals and selectively apply certain of said classification code signals to said memory for storage in said memory locations.

2. An electronic cash register as claimed in claim 1 wherein said code converter means includes a first plug board for receiving the classification code signals from said input means, and means for selectively coupling said plug board to storage locations of said internal memory.

3. An electronic cash register as claimed in claim 2 including an on line storage device coupled to said input means for storage and transmission of signals corresponding to price and classification codes of goods produced by said input means to a computer processing station.

4. An electronic cash register as claimed in claim 3 wherein said storage means includes a magnetic cassette recorder.

5. An electronic cash register as claimed in claim 4 and including display means and printing means coupled to said input means for respectively displaying and printing the price and classification codes in response to the signals produced by said input means.

* * * * *